US006217266B1

United States Patent
Bowling

(10) Patent No.: US 6,217,266 B1
(45) Date of Patent: Apr. 17, 2001

(54) DRILL GUIDE FOR DRILLING LONG HOLES IN DOORS

(76) Inventor: Roy E. Bowling, 6691 W. 10th Pl., Lakewood, CO (US) 80214

( * ) Notice: Subject to any disclaimer, the term of this patent is extended or adjusted under 35 U.S.C. 154(b) by 0 days.

(21) Appl. No.: 09/382,043

(22) Filed: Aug. 24, 1999

Related U.S. Application Data

(60) Provisional application No. 60/128,484, filed on Apr. 9, 1999.

(51) Int. Cl.$^7$ ..................................................... B23B 45/14
(52) U.S. Cl. .......................... 408/115 R; 408/88; 408/97; 408/103
(58) Field of Search ................................ 408/88, 97, 103, 408/115 R, 236

(56) References Cited

U.S. PATENT DOCUMENTS

| 310,710 | * | 1/1885 | Nichols . | |
|---|---|---|---|---|
| 3,552,239 | | 1/1971 | Yeaman et al. . | |
| 3,598,496 | | 8/1971 | Skinner . | |
| 3,626,513 | * | 12/1971 | Pytlak | 408/97 |
| 3,864,053 | | 2/1975 | Harwood . | |
| 4,331,411 | | 5/1982 | Kessinger et al. . | |
| 4,585,376 | * | 4/1986 | Davenport, Sr. et al. | 408/110 |
| 4,793,747 | * | 12/1988 | Reitz | 408/72 R |
| 4,865,496 | * | 9/1989 | Challis | 408/72 R |
| 4,906,146 | | 3/1990 | Bowling . | |
| 4,948,304 | | 8/1990 | Kobayashi . | |
| 4,978,257 | * | 12/1990 | Nowman | 408/111 |
| 5,018,912 | * | 5/1991 | Reitz | 408/115 R |
| 5,791,834 | | 8/1998 | Zehrung . | |
| 6,116,826 | * | 9/2000 | Benway | 408/1 R |

FOREIGN PATENT DOCUMENTS

| 2645576 | * | 10/1990 | (FR) . |
| 2203069 | * | 10/1988 | (GB) . |

* cited by examiner

Primary Examiner—Henry Tsai
(74) Attorney, Agent, or Firm—Ralph F. Crandell

(57) ABSTRACT

A drilling guide or jig for guiding an elongated drill bit for drilling a long hole through a panel such as a door from one edge to a point adjacent another edge thereof. The guide is formed by a rigid, elongated, rectangular base plate defining an elongated slot and positionable along one edge of the door. A pair of arms are mounted one on each long side edge of the plate at about the midpoint thereof and extend generally perpendicularly to the plate. The arms define at one end a pair of spaced apart jaws extending from said plate and adapted to hold the plate on the door or panel. The arms further define a pair of spaced apart support members extending from the plate opposite to the jaws. A drill guide block is pivotally mounted between the free ends of the support members in spaced relation to the plate, and adjustably supports a drill guide tube extending between the arms. The tube supports and guides an elongated drill bit for drilling at a selected angle through the elongated slot in the plate and the panel for producing a long hole extending generally transversely through the panel.

9 Claims, 6 Drawing Sheets

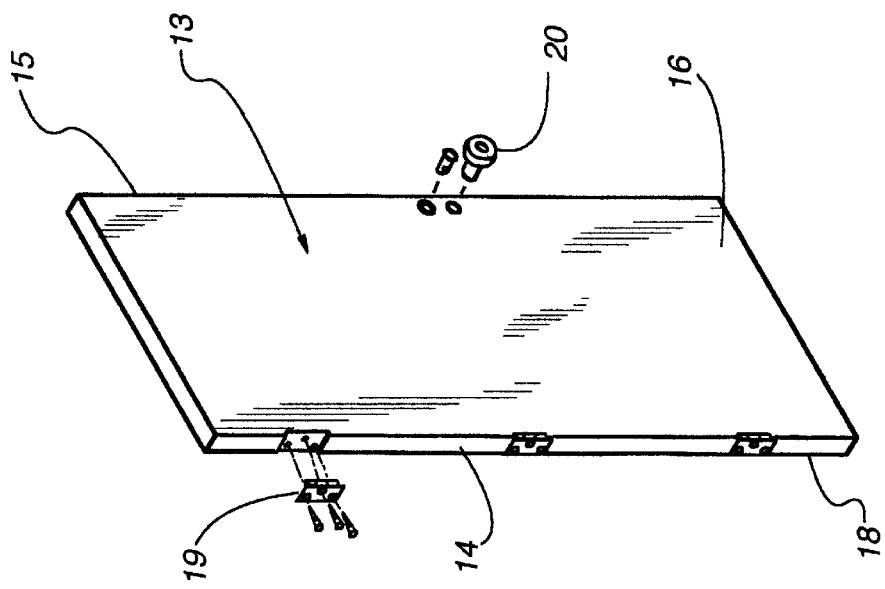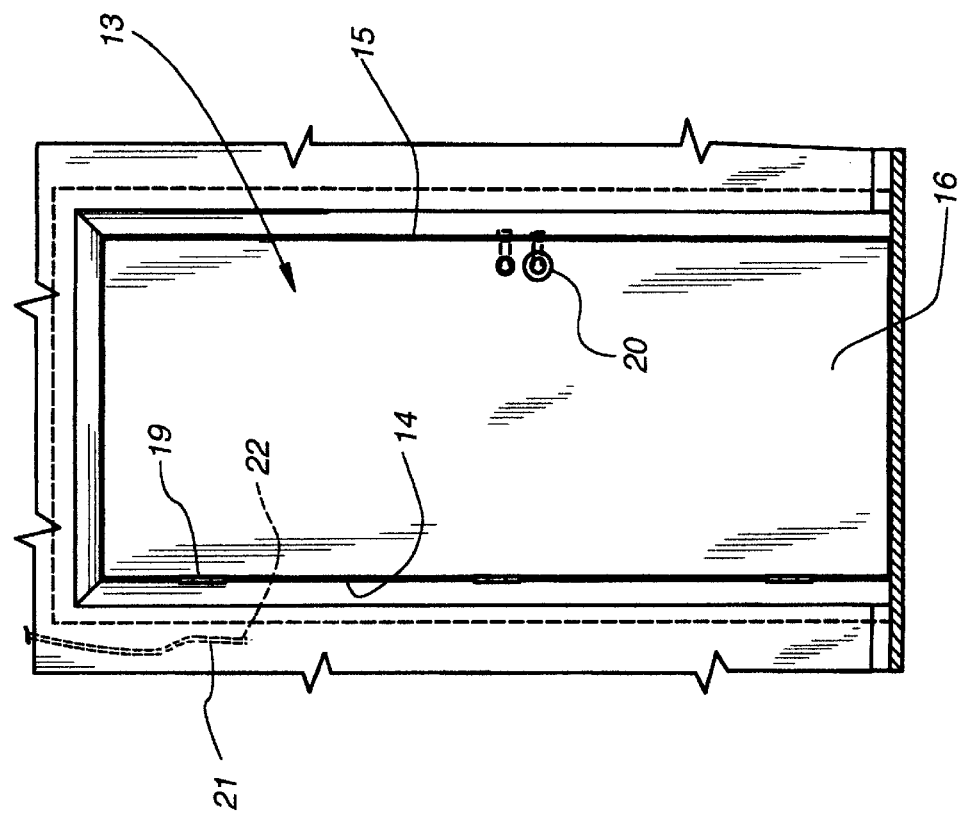

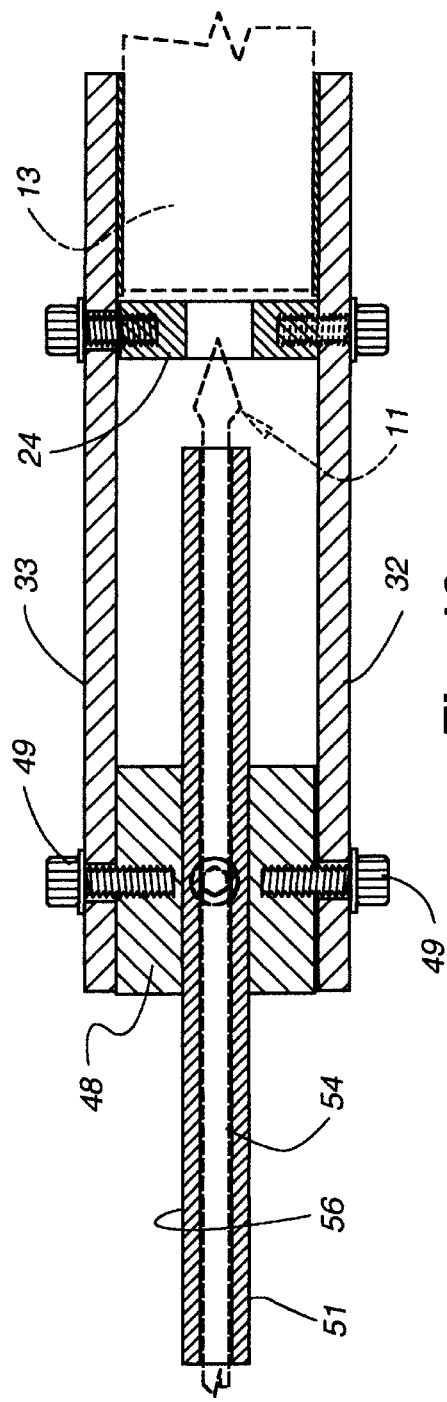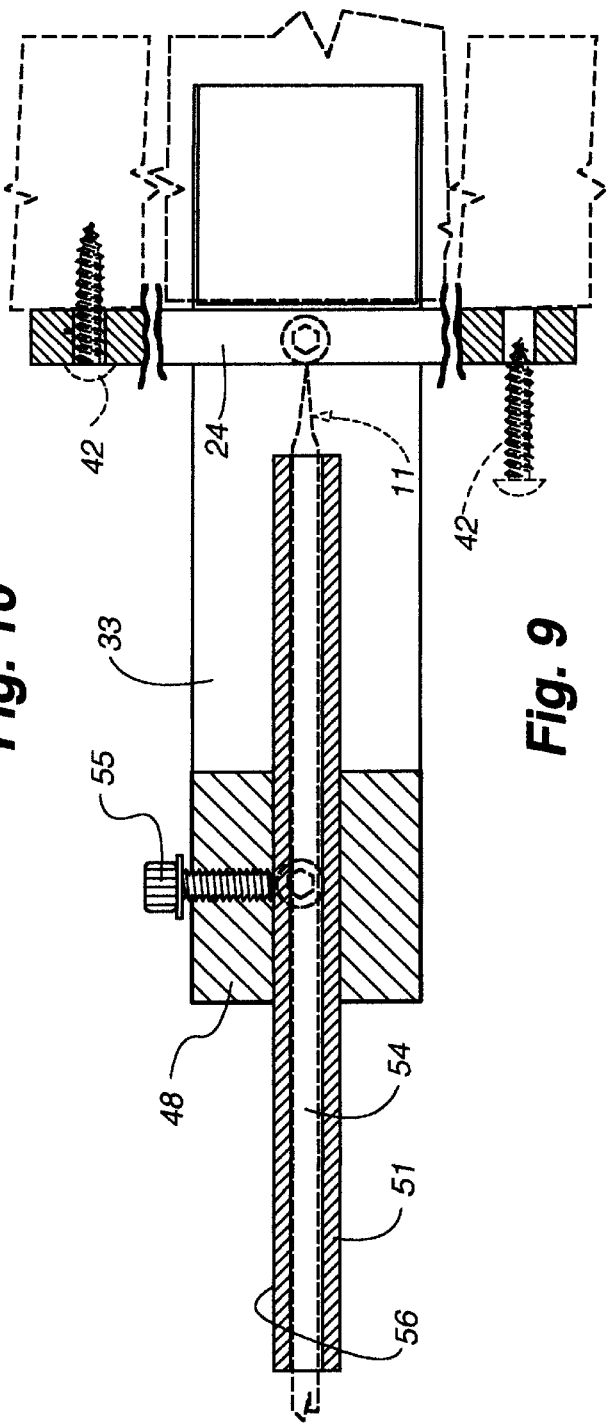

DRILL GUIDE FOR DRILLING LONG HOLES IN DOORS

CROSS REFERENCE TO RELATED APPLICATION

This application claims the benefit of Provisional Application Ser. No. 60/128,484, filed Apr. 9, 1999, by Roy E. Bowling, for DRILL GUIDE FOR DRILLING LONG HOLES IN DOORS.

BACKGROUND OF THE INVENTION

1. Field of the Invention

The present invention relates to drilling tools and more particularly to drill guides or jigs. More specifically, the present invention relates to a drilling jig for guiding an elongated drill bit when drilling a hole through a panel such as a door from one edge thereof to the opposite edge.

2. Description of the Prior Art

A fixture for use in drilling a hole through a door from one edge to an opposite edge is shown in U.S. Pat. No. 5,791,834, issued Aug. 11, 1998, to Raymond E. Zehrung for "Fixture for Drilling a Longitudinal Hole in a Door".

A long drill bit which is capable of maintaining a desired penetration angle and path when drilling long holes is shown in U.S. Pat. No. 4,906,146, issued Mar. 6, 1990, to Roy E. Bowling for "Axially Self-Aligning Drill Bit". The drill bit has a stiffly flexible shank with a unique drilling tip that maintains the desired path and does not walk or deflect therefrom.

OBJECTS OF THE INVENTION

The principal object of the present invention is to provide an improved drilling jig or guide for guiding a drill bit when drilling long holes through panels such as doors from one edge to the opposite edge thereof.

Another object of the invention is to provide a drilling jig or guide of the foregoing character which is rugged, simple to use, and accurately directs a drill bit through a door or like panel from edge to edge and between the surface panels thereof.

SUMMARY OF THE INVENTION

The present invention is a drilling guide or jig for use in guiding a long, stiffly flexible drill bit when drilling a long hole through a panel such as a door from one vertical edge to the other between the spaced side or face panels thereof, such as for drilling a hole from a hinge area of a door to a lock or latch area of the door for use in wiring an electric lock.

The jig embodying the invention is formed by a narrow, elongated, rigid, base plate positionable or mountable on one edge, such as a vertical edge, of a door or panel. The plate defines opposed longitudinal side edges, shorter end edges, and opposed surfaces therebetween. The plate further defines an elongated slot opening into said surfaces for passing a drill bit. One of the surfaces is adapted for placement against an edge of the door, usually in a hinge area when drilling a hole for the installation of wiring for an electric lock.

A pair of elongated rigid arms are mounted one on each plate side edge at about the midpoint thereof and extend generally perpendicularly to the plate surfaces. At least one cap screw secures each arm to the juxtaposed plate edge. The arms define a pair of spaced jaws extending from the surface of the plate adapted to be placed against the panel edge. The jaws engage opposite sides of the door panel for holding the jig securely against the door. The arms further define a pair of spaced apart support members extending from the surface of said plate opposite the edge engaging surface. A drill guide supporting block is pivotally mounted between the support members at a point spaced from the plate. The block is secured to the arms by cap screws when positioned in a selected angular relationship thereto. A drill guide tube is adjustably carried by said block and extends between the arms for supporting and guiding an elongated drill bit extending and drilling at said selected angle through the elongated slot for producing a long hole extending transversely through the panel from one panel edge to the other at the selected angle.

DESCRIPTION OF THE DRAWINGS

FIG. 1 is a front elevation view of a door through which a long hole is to be drilled for receiving a wire.

FIG. 2 is a perspective view of the door shown in FIG. 1 with a hinge and lock mechanism in exploded relation.

FIG. 9 is a section view taken substantially in the plane of line 9—9 on FIG. 3.

FIG. 10 is a section view taken substantially in the plane of line 10—10 on FIG. 3.

DESCRIPTION OF THE PREFERRED EMBODIMENT

Figure 4:
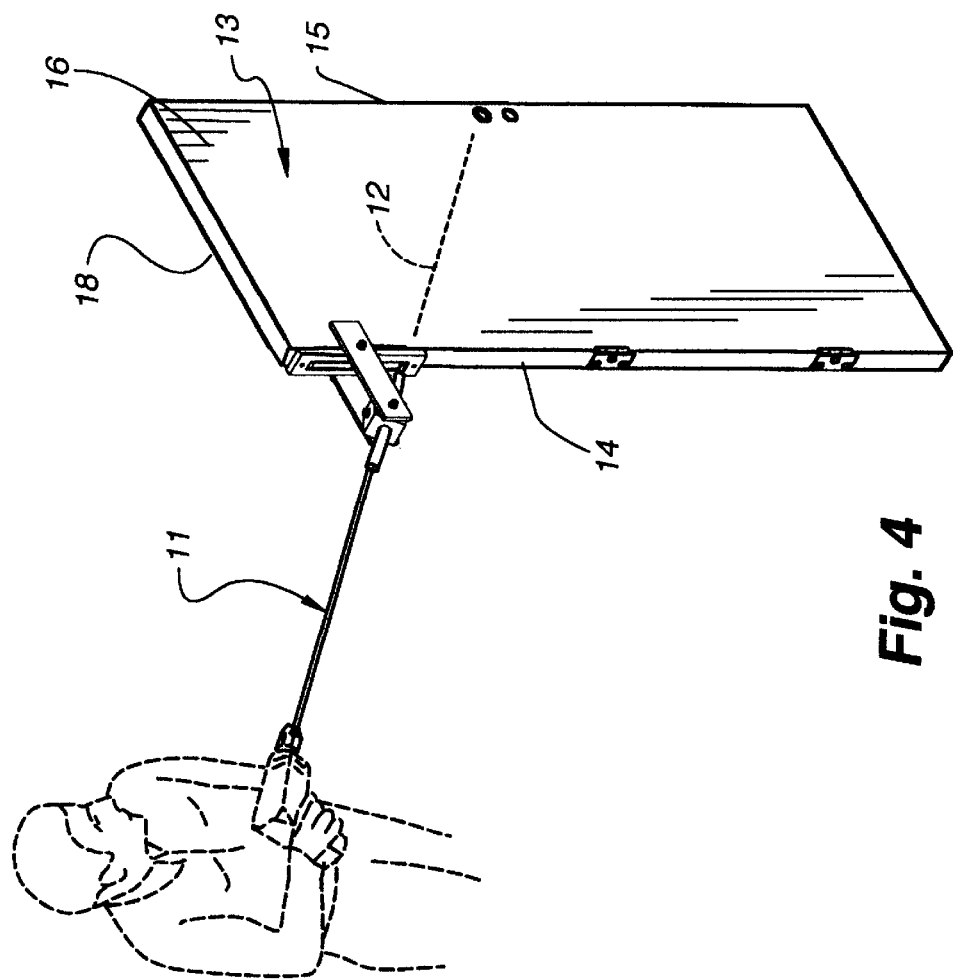
FIG. 4 is a view similar to FIG. 3 but showing a drill in position for drilling a hole from the hinge area to the lock area.
Figure 3:
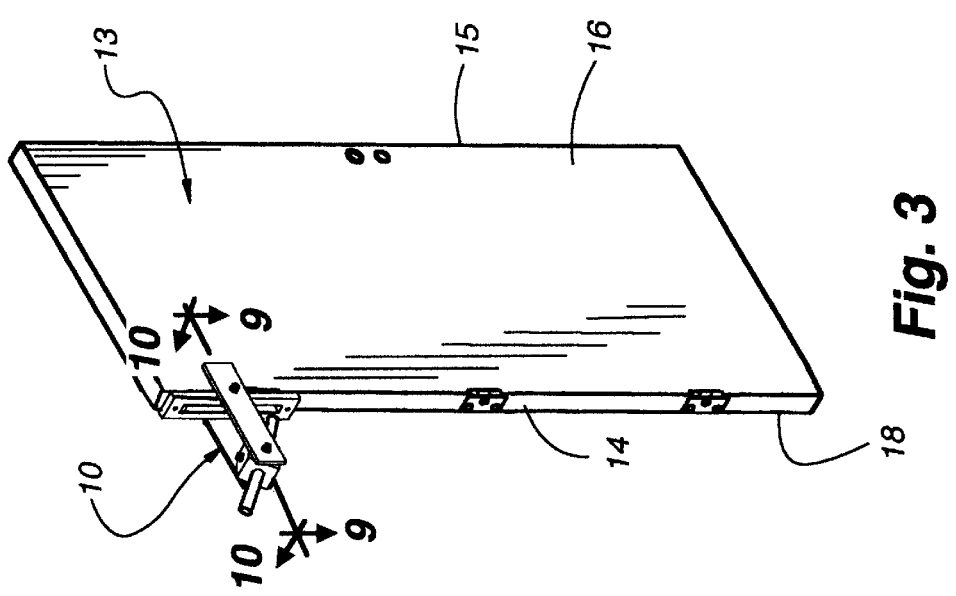
FIG. 3 is a view similar to FIG. 2 but with a drilling guide or jig embodying the present invention mounted in drilling position thereon.

The present invention is an improved drilling jig or guide 10 finding particular but not necessarily exclusive utility for guiding a long, stiffly flexible drill bit 11 when drilling a long hole 12 through a door 13 from one vertical edge 14 to the other or opposite vertical edge 15 between the face or side panels 16,18. Such a jig 10 is useful, for example, when drilling a hole from the area of a hinge 19 on one edge 14 of a door to the area of a lock or latch 20 on the opposite edge 15 for use in connecting a wires 21, 22 to convert the lock 20 to an electric lock.

The improved drill guide or jig 10 embodying the present invention incorporates an elongated, rigid base plate 24 adapted to be placed on and held against an edge 14 of the door 13. The base plate 24 defines elongated, opposed side edges 25,26, opposed end edges 27,28, and opposed plate surfaces or sides 29,30, extending therebetween. For passing the drill bit 11, an elongated slot 31 is defined in the plate 24 opening therethrough between the plate surfaces 29,30. The plate 24 supports a pair of transversely extending jaw arms 32,33 mounted thereon one on each side edge 25,26 thereof in normal or perpendicular relationship thereto. The jaw arms 32,33 are secured to the plate 24 by machine or cap screws 35, one of said arms 33 being secured by two cap screws 35 and the other arm 32 by one cap screw 35, thereby to prevent the jaw arms from pivoting or swinging with respect to the base plate 24. A washer 36 is desirably used with each cap screw.

The jaw arms 32,33 extend away from one side or surface 29 of the base plate 24 and form jaws 38,39 for engaging and gripping the side panels 16,18 of a door 13 adjacent to the edge 14 on which the jig 10 is mounted for drilling. In order to prevent marring of the door panels, protective pads 40 are provided on the faces of the jaws 38,39. To further secure the base plate to the door, the plate may include holes or apertures 41 for receiving temporary mounting screws 42.

Figure 5:
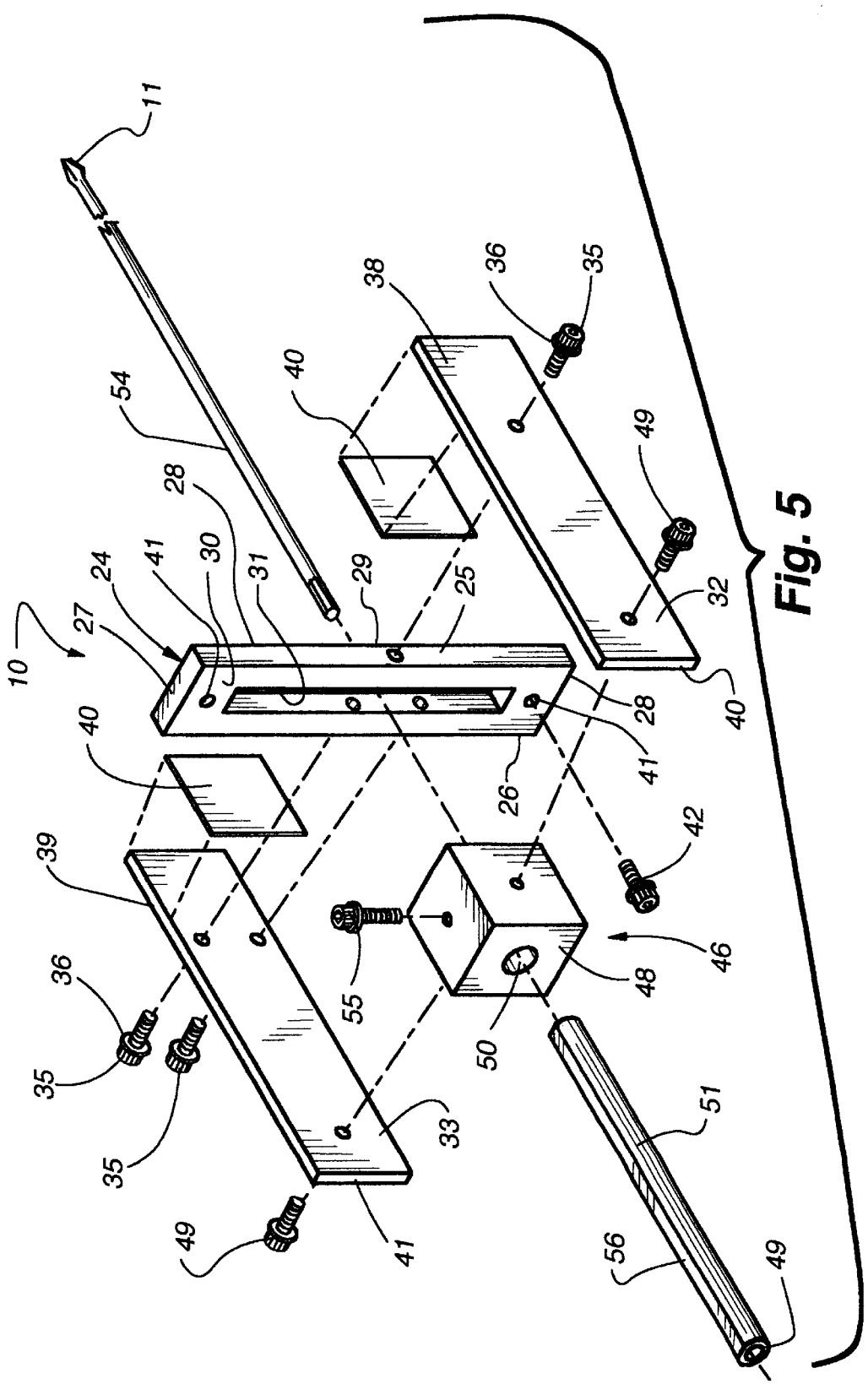
FIG. 5 is an exploded view of a drill guide or jig embodying the present invention.
Figure 6:
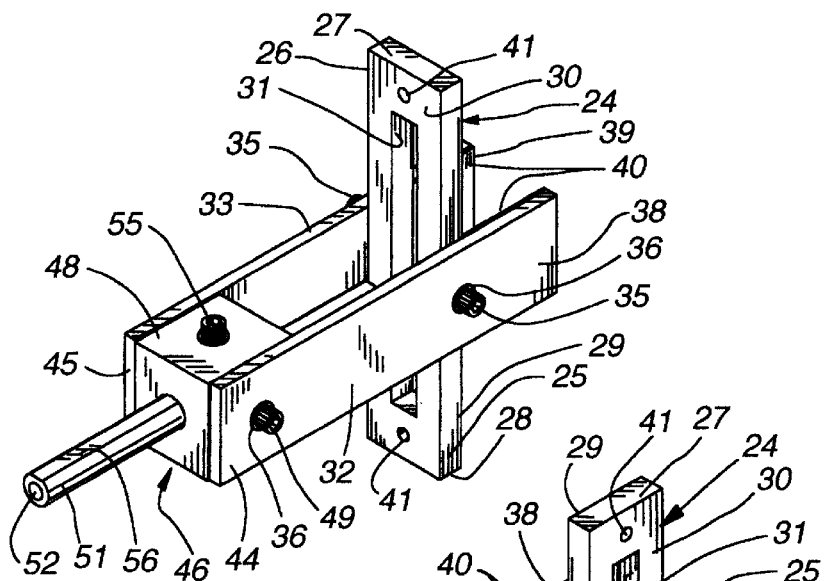
FIG. 6 is a right hand perspective view of a drilling guide embodying the present invention.
Figure 7:
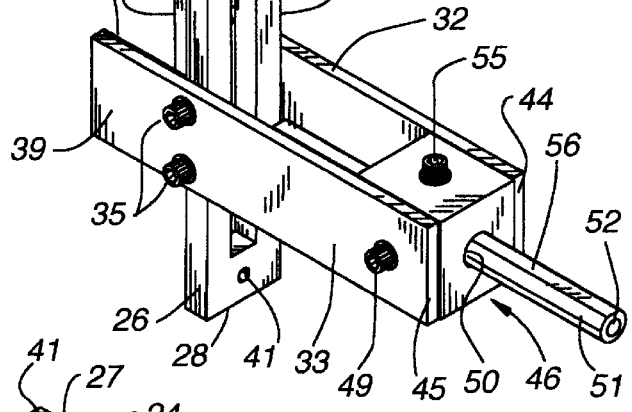
FIG. 7 is a left hand perspective view thereof.
Figure 8:
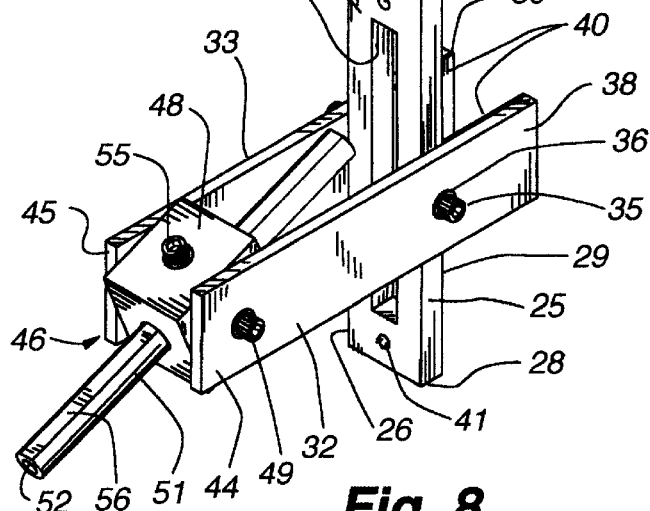
FIG. 8 is a perspective view similar to FIG. 5 but with the drilling guide positioned for drilling at an angle with respect to the door edge.
Figure 11:
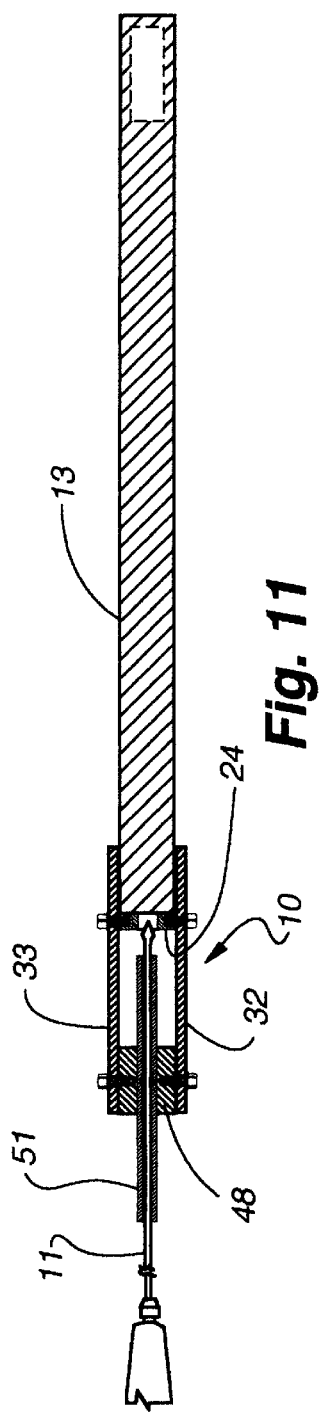
FIG. 11 is a section view similar to FIG. 9 and showing a drill bit in starting position.
Figure 12:
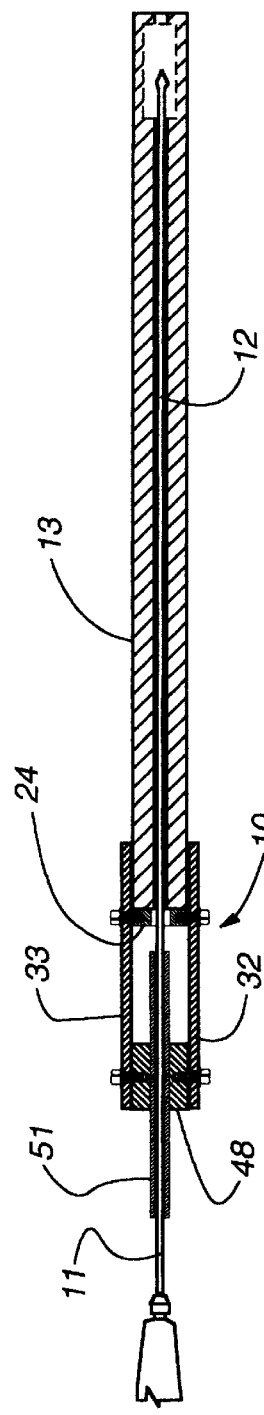
FIG. 12 is a section view similar to FIG. 11 and showing a drill bit having drilled a long hole through a door.
Figure 13:
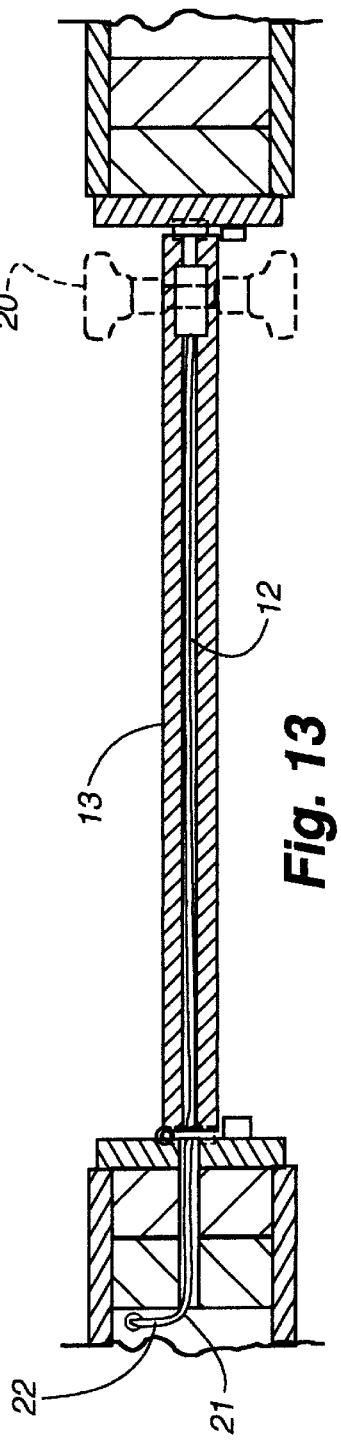
FIG. 13 is a horizontal section view through a door and door frame showing a wiring hole drilled through the same.

Each of the arms 32, 33 extends away from the base plate 24 surface 30 opposite the jaws and support at their outer ends 44,45 an angularly adjustable drill guide assembly 46 (FIGS. 5–8). The drill guide assembly 46 is formed by a guide block 48 which is mounted between the ends 44,45 of the arms 32,33 and secured thereto by a pair of cap screws 49 extending through the arms into threaded engagement with the block 48. By loosening the cap screws 49, the angular position of the guide block 48 can be adjusted by pivoting the block relative to the arms. The block 48 is then secured in the desired angular position by tightening the cap screws 49. The guide block 48 in turn defines a bore 50 in which is supported a drill guide tube 51 extending through the block 48 between the arms 32, 33. To this end the axis of the guide block bore 50 extends transversely to the axis of the mounting screws 49, and lies in a plane parallel to the planes of the arms, and perpendicular to the plane of the base plate 24.

The drill guide tube 51 is an elongated sleeve or tube of hardened steel and defines a central bore 52 coaxial with the bore 50 of the block 48 and of a diameter sufficient to slidably and rotatably receive the shank 54 of the drill bit 11 thereby to support the bit and guide the same during the drilling operation. The tube 51 is of a length sufficient to adequately support the shank of a stiffly flexible drill bit of the character described in U.S. Pat. No. 4,906,146, or other drill bit configuration suitable for drilling long holes.

To enable the position of the inserted drill guide tube 51 to be adjusted longitudinally with respect to the guide block 48, the block includes a set screw 55 extending into the guide block bore 50 for biting into a longitudinal flat 56 machined on the surface of the guide tube 51 for holding engagement with the same.

In one illustrative embodiment of the present invention, the base plate 24 is a rigid plate of a material such as aluminum, having a width equal to the width of an average door or about 1¾ in. (4.5 cm.), a thickness of about ½ in. (1.3 cm.) and a length of about 13 inches (31.5 cm.). The longitudinal elongated drill receiving slot 31 is about 10 inches (27.4 cm.) in length and about ⅝ inch (1.6 cm.) in width. The arms 32,33 are rigid aluminum plates about 3/16 in.×2 in.×8 in. (0.5 cm.×5.08 cm.×24.4 cm.). The tube block 48 is aluminum and has the dimensions 1¾ in.×2 in.×2 in. (4.5 cm.×5.08 cm.×5.08 cm.). The drill guide tube 51 is a hardened steel tube about 8 in. (24.4 cm.) long, having an outside diameter of about ⅝ in. (1.6 cm.) and a ¼ in. (0.64 cm.) bore. The angle range for the drill guide tube 51 is from about 45° above the horizontal to about 45° below the horizontal.

In use, the drill guide assembly 46 is positioned with the drill guide tube 51 at the desired angle, and a drill bit 11 such as a drill bit of the type shown in U.S. Pat. No. 4,906,146 inserted therein, along a door edge adjacent to the hinge area from which the desired hole 12 is to be drilled. The cap screws 35 are tightly secured to hold the jig securely on the door 13. A long hole 12 is then drilled at the desired angle through the door 13 from one edge 14 to the other 15 between the door faces. Appropriate wiring can then be inserted through the hole 12, for example to wire an electric lock.

For certain applications such as extra thick doors or panels or in cramped or corner applications or other applications in which is not feasible to remove the door from the door frame and the frame interferes with the mounting of the drilling guide or jig on the hinge edge of the door, one of the arms may be omitted and the base plate temporarily fastened with screws to the panel or door edge. As a further alternative the jaw end 38 or 39 of either or both of the arms 32 or 33 may be omitted and reliance placed on temporarily screwing the base plate 30 to the panel edge when drilling the long hole.

While a certain illustrative embodiment of the present invention has been shown in the drawings and described above in detail, it should be understood that there is no intention to limit the invention to the specific form disclosed. On the contrary the intention is to cover modifications, alternative constructions, equivalents, and uses falling within the spirit and scope of the invention as expressed in the appended claims.

What is claimed is:

1. A drilling guide for guiding a drill bit for drilling a long hole through a panel from one edge to another edge thereof, and between the sides thereof, said guide comprising:

a rigid, elongated, rectangular base plate positionable along said one edge, said plate having opposed long sides and opposed faces and defining an elongated slot through said faces, a pair of arms mounted one on each long side edge of said plate at about the midpoint thereof and extending generally perpendicularly to the faces of said plate, said arms integrally defining a pair of spaced apart jaws extending from said plate and adapted to secure said plate to said panel by gripping the sides thereof, said arms further integrally defining a pair of spaced apart support members extending from said plate opposite to said jaws, a drill guide block pivotally mounted between said support members in spaced relation to said plate, and a drill guide tube adjustably carried by said block and extending between said arms for supporting and guiding an elongated drill bit for drilling at a selected angle through said elongated slot in said plate and said panel for producing a long hole extending generally transversely through said panel from said one panel edge to the other.

2. A drilling jig for guiding a drill bit for drilling a long hole through a panel from one edge to an opposite edge thereof, and between the sides thereof, comprising:

a rigid, elongated, rectangular base plate positionable along one of said panel edges, said plate having opposed long sides and opposed faces and defining an elongated slot through said faces, a pair of arms mounted one on each long side edge of said plate at about the midpoint thereof and extending generally perpendicularly to the faces of said plate, said arms integrally defining a pair of spaced apart jaws adapted to be placed against said sides of said panel for holding the jig thereon, said arms further integrally defining a pair of spaced apart support members on the opposite side of said base plate from said jaws, a drill guide block pivotally mounted between said support members and spaced from said plate, means for securing said block to said support members in a selected angular relationship with respect thereto, a tubular drill guide adjustably carried by said block and extending between said arms for supporting and guiding an elongated drill bit, said block and tube being positionable at a selected angle, whereby said drill guide tube guides said drill bit to produce a long hole extending generally transversely through said panel from one edge thereof to the other.

3. A drilling jig for guiding a drill bit for drilling a long hole through a panel from one edge to another edge thereof, and between the sides thereof, said jig comprising a rigid, elongated, rectangular base plate positionable along one of said edges, said plate having opposed long sides and opposed faces and defining an elongated slot through said faces, a pair of arms mounted one on each longitudinal side edge of said plate at about the midpoint thereof and extending generally perpendicularly to the faces of said plate, said arms integrally defining a pair of spaced apart jaws adapted to clampingly engage the sides of said panel for holding said jig thereon, said arms further integrally defining a pair of spaced apart support members on the opposite side of said plate from said jaws, a block pivotally mounted between said support members in spaced relation to said plate, means for securing said block to said support members in a selected angular relationship thereto, and a drill bit guide tube adjustably carried by said block and extending between said arms for supporting and guiding an elongated drill bit, said block and tube being positionable at a selected angle with respect to said plate whereby said drill bit produces a long hole extending generally transversely through said panel from one edge thereof to the other.

4. A drilling guide for guiding a drill bit for drilling a long hole through a panel such as a door from one edge to another edge thereof, and between the sides thereof, said guide comprising an elongated, rigid, rectangular base plate positionable along and against said one edge, said plate defining opposed longitudinal side edges and opposed surfaces therebetween, said plate further defining an elongated slot opening into said surfaces for passing a drill bit, one of said surfaces being adapted for placement against said one panel edge, a pair of rigid rectangular arms mounted one on each said plate side edge at about the midpoint thereof and extending generally perpendicularly to said plate surfaces, at least one cap screw securing each said arm to the juxtaposed plate side edge, said arms integrally defining a pair of spaced apart jaws extending from the surface of said plate adapted to be placed against said panel edge for engaging opposite sides of said panel for holding said plate against said one edge of said panel, said arms further integrally defining a pair of spaced apart support members extending from the surface of said plate opposite said panel edge engaging surface, a block pivotally mounted between said support members and spaced from said plate, means for securing said block to said support members in a selected angular relationship thereto, and a drill guide tube adjustably carried by said block and extending between said arms for supporting and guiding an elongated drill bit extending and drilling at said selected angle through said elongated slot and said panel for drilling a long hole extending generally transversely through said panel from said one panel edge to the other.

5. A drilling jig for use with an elongated, stiffly flexible drill bit for drilling a long hole through a door from one edge thereof to another, and between the sides thereof, said jig comprising:

a rigid, elongated, rectangular plate mountable on one edge of a door, means for securing said plate to said door, said plate defining an elongated slot extending lengthwise thereof, at least one rigid, elongated arm secured to said plate and extending therefrom in a perpendicular relationship thereto, a support block pivotally mounted on said arm and defining a bore having an axis lying in a plane perpendicular to said plate, a drill bit guide tube supported in said bore for angular adjustment with respect to said plate in a plane perpendicular to the plane of said plate, an axially extending flat on said guide tube, and a set screw threadably mounted in said block for releasably engaging said flat thereby releasable securing said guide tube in said block bore, whereby a long hole can be drilled through said door by an elongated drill bit guided by said guide tube and extending through said elongated drill plate slot.

6. A drilling jig as defined in claim 5, wherein said securing means comprises screws extending through apertures defined in said plate into engagement with said door edge.

7. A drilling jig as defined in claim 5 wherein said securing means comprises a pair of spaced apart clamping jaws extending from said plate into engagement with said door.

8. A drilling jig as defined in claim 5 comprising two rigid elongated arms secured to said plate.

9. A drilling jig as defined in claim 8 wherein said arms form spaced apart clamping jaws for securing said plate to said door.

* * * * *